US006922887B1

(12) United States Patent
Keswani

(10) Patent No.: US 6,922,887 B1
(45) Date of Patent: Aug. 2, 2005

(54) SOCKET FOR WIRE CONNECTOR DRIVER OR WRENCH

(75) Inventor: Sushil N. Keswani, Sycamore, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 37 days.

(21) Appl. No.: 10/463,714

(22) Filed: Jun. 16, 2003

Related U.S. Application Data

(63) Continuation-in-part of application No. 10/137,993, filed on May 2, 2002, now abandoned.

(51) Int. Cl.[7] .......... B23P 19/00
(52) U.S. Cl. .......... 29/757; 29/729
(58) Field of Search .......... 29/729, 757, 758; 81/467, 121.1

(56) References Cited

U.S. PATENT DOCUMENTS 1,321,776 A 11/1919 Stepanian
3,378,906 A 4/1968 Dorsey
3,787,948 A * 1/1974 Runge .......... 81/121.1
4,357,845 A 11/1982 Cornia
4,823,650 A 4/1989 Tuttle
4,860,618 A 8/1989 Givot
4,945,791 A 8/1990 Herschler et al.
5,697,268 A 12/1997 Makovsky et al.
5,784,935 A 7/1998 Korinek
5,806,382 A 9/1998 Hall, Jr.
5,832,796 A * 11/1998 Chopra .......... 81/467
5,887,631 A 3/1999 Eaton
5,974,916 A 11/1999 Lassiter
6,198,049 B1 3/2001 Korinek
6,206,432 B1 3/2001 Kamiyama

* cited by examiner

*Primary Examiner*—John C. Hong
(74) *Attorney, Agent, or Firm*—Cook, Alex, McFarron, Manzo, Cummings & Mehler, Ltd.

(57) ABSTRACT

An elongated socket having an opening for receiving a wire connector to connect at least a pair of wires inserted in the wire connector. The socket is formed in an elongated cylindrical body having a wire connector receiving end. The socket is formed with four bores of different cross sections. These include an outermost bore positioned adjacent the wire connector receiving end of the body. An innermost bore is positioned farthest axially away from the wire connector receiving end of the body. Two intermediate bores are located between the outermost and innermost bores. The bores decrease in cross section from the outermost to the innermost. Each of the bores is defined by an imperforate circumferential wall of the body and has alternately positioned ribs and grooves. The grooves of the outermost bore are dimensioned to receive wings extending from a skirt of a wire connector. One of the intermediate bores has grooves dimensioned to receive wings extending from a truncated conical body of a wire connector. A connector pre-capture detent for a wing style wire connector is formed in the outermost bore and a connector pre-capture detent for a finned connector is formed in the inwardly located intermediate bore. The socket may be formed in a connector driver or in a hand wrench.

10 Claims, 3 Drawing Sheets

SOCKET FOR WIRE CONNECTOR DRIVER OR WRENCH

This is continuation-in-part of application Ser. No. 10/137,993, filed May 2, 2002, now abandoned.

BACKGROUND AND SUMMARY OF THE INVENTION

This invention is directed to a device for attaching the ends of two or more wires of an electrical circuit together using a twist-on type wire connector. These connectors are available in a variety of sizes and shapes including truncated conical types with an outer ribbed surface, wing connectors and what are called finned connectors. The connectors can be fastened to the ends of the wires by a workman tightening the connector over the wires by hand. This was the original method of tightening the connector over the wires. Later, wrenches were provided to enable the worker to apply more force to make better connections. In recent years, as cordless electric tools have become more prevalent in the marketplace, the workers frequently use such tools to tighten the wire connector on to the ends of the wires.

This invention is directed to a device for attaching a wire connector to the ends of one or more wires which device can be connected to the chuck of a battery operated power tool or to a manually operated wrench. In contrast to previous power operated wire connector drivers and hand activated wrenches, the device of this invention can be used to twist on a wide variety of wire connectors of different sizes and styles, including the conventional ribbed, somewhat conical shaped connectors, wire connectors having wings located on their skirts and wire connectors having wings extending from the frusto-conical portions of their bodies which are conventionally referred to as "finned" connectors.

An object of this invention is a wire connector device such as a driver or a wrench having a connector receiving socket defined by an imperforate annular wall which strengthens the body of the driver.

Another object of this invention is a wire connector driver or wrench which can accommodate an in-line wing style connector.

Still another object of this invention is a wire connector driver or wrench which can pre-capture wing and finned connectors and hold them in an inverted position prior to installation on the wires.

Yet another object of this invention is a wire connector driver which can accommodate a multitude of different styles and/or sizes of wire connectors.

Other objects of the invention will be found in the following specification, claims and drawings.

BRIEF DESCRIPTION OF THE DRAWINGS

The invention is illustrated more or less diagrammatically in the following drawings, wherein.

DESCRIPTION OF THE PREFERRED EMBODIMENTS

The device of this invention may be embodied in a wire connection driver, which is driven by a power tool or in a wrench, which is hand powered.

Figure 1:
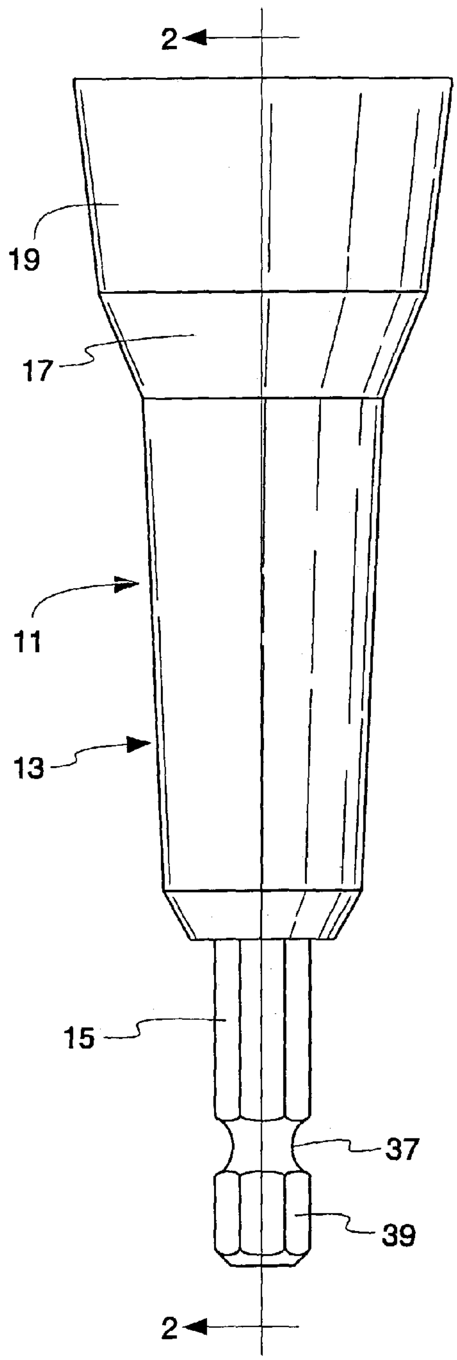
FIG. 1 is a side view of a first embodiment of this invention depicted in a wire connector driver.
Figure 2:
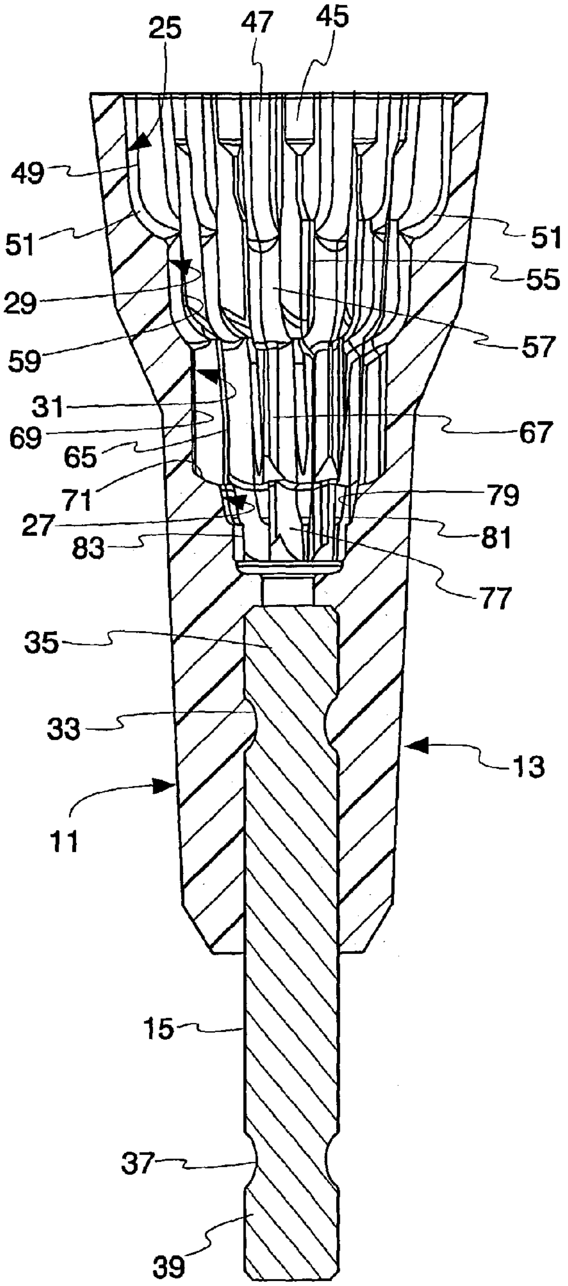
FIG. 2 is a cross sectional view taken along line 2—2 of FIG. 1.

FIG. 1 of the drawings shows a wire connector driver 11 of this invention. It includes an elongated cylindrical body 13 formed of a suitable plastic having a steel drive shaft 15 extending therefrom which is to be inserted in the chuck of a power tool. The body 13 includes a somewhat cylindrical portion 17 having an outwardly flared enlarged portion 19 formed integrally therewith. A socket 21 is formed in the outwardly flared portion 19 of the cylindrical body 13. The socket includes an outer bore 25, an innermost bore 27, an outwardly located intermediate bore 29 and an inwardly located intermediate bore 31.

Conventionally, the body 13 is molded over the steel drive shaft 15 and to securely anchor the drive shaft to the cylindrical plastic body, a circumferential groove 33 is formed in the drive shaft near the end of the drive shaft embedded in the cylindrical body 13, thus forming an anchoring head 35. At the opposite end of the drive shaft 15, another circumferential groove 37 is formed remote from the end of the shaft to form a hex head 39 which seats in the chuck of a cordless power tool.

The four bores 25, 27, 29 and 31 vary in cross section from the outer bore 25 which is the largest to the inner bore 27 which is the smallest. The outer bore 25 is formed with ribs 45 and grooves 47 formed in the outwardly flaring portion 19 of the cylindrical body 13 with the grooves defined by arcuate outer walls 49 which extend in a generally axial direction of the cylindrical driver body 13. The outer walls 49 terminate inwardly at curved shoulders 51 which blend into the outer walls 49 of the grooves. In this example, the outer bore 25 has ten ribs 45 and ten grooves 47, but this number may vary depending on the nature of the wire connectors to be driven. These grooves 47 are axially aligned with the body 13 and have sufficient diameter to receive the wings extending from skirts of wire connectors.

Located axially inwardly of the outer bore 25 is the outwardly located intermediate bore 29. This bore has ribs 55 and grooves 57 aligned with the ribs 45 and grooves 47 respectively of the outer bore 25. The grooves 57 are defined by outer walls 59 which have shorter axial lengths than the outer walls 49 of the outer bore 25. The grooves also have curved shoulders 61 whose curvature is less pronounced than the curved shoulders 51 and grooves 47 of the outer bore 25. The diameter of the outwardly located intermediate bore 29 is not as large as that of the outer bore 25.

Figure 3:
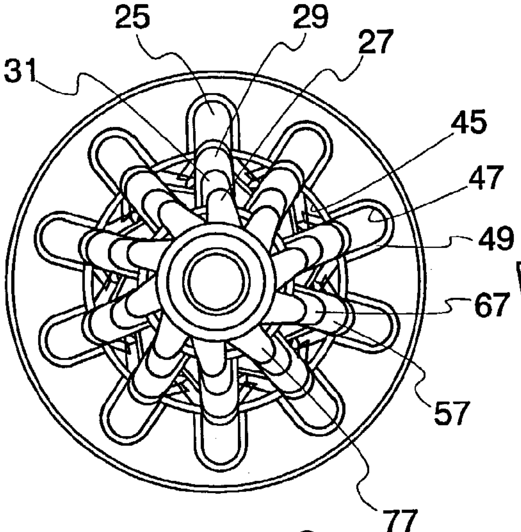
FIG. 3 is an end view of the wire connector of FIG. 1.

The inwardly located intermediate bore 31 is located axially inwardly of the bore 29. It is defined by ribs 65 and grooves 67 which align with the ribs 55 and grooves 57 of the outward intermediate bore 29. The grooves 67 have outer walls 69 that are almost straight in an axial direction and are longer than the outer walls 59 of the outward intermediate bore 29. A slightly curved shoulder 71 is located at the axially inwardly end of each wall 69 with the shoulders not blending into the straight wall 69. The diameter of the inwardly located intermediate bore 31 is smaller than that of its outwardly located bore 29. As can be best viewed in the end view shown in FIG. 3 of drawings, the grooves 67 are axially aligned with the grooves 57 of the adjacent outwardly bore 29 but are slightly shifted in a clockwise direction relative to these grooves.

The inner bore 25 is formed with ribs 75 and grooves 77. The outer wall 79 of each groove 77 has a curved portion 81 and an axially straight portion 83 located axially inwardly of the curved portion. As can best be seen in FIG. 3, these grooves are tilted in a counter-clockwise direction relative to the grooves of the other sockets.

Figure 4:
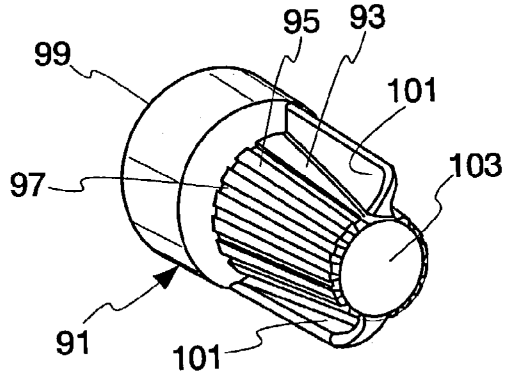
FIG. 4 is a perspective view of a "finned" wire connector.
Figure 5:
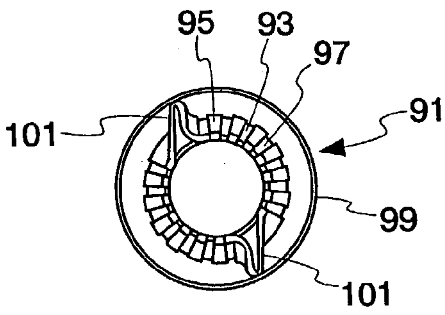
FIG. 5 is an end view of the "finned" connector of FIG. 4.
Figure 6:
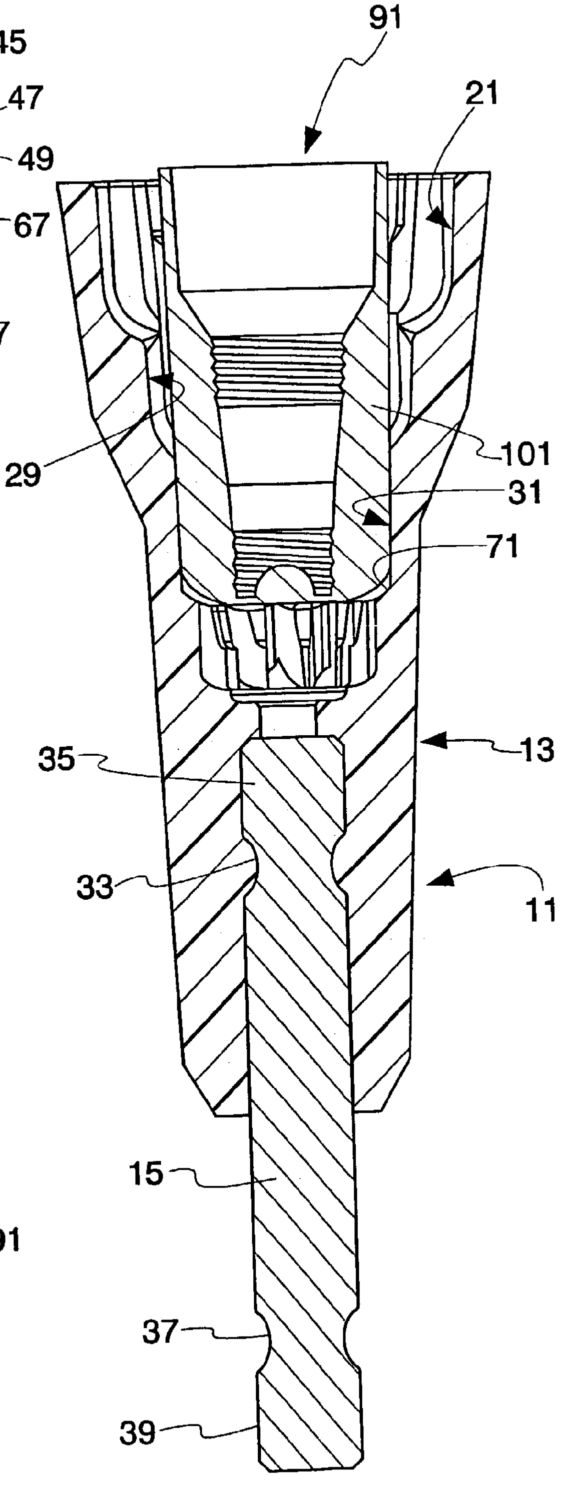
FIG. 6 is a longitudinal cross sectional view of a wire connector driver of FIG. 1 containing a "finned" wire connector of the type shown in FIG. 4.

A finned wire connector 91 is shown in FIGS. 4 and 5 of the drawings and is shown seated in the socket 21 of the driver 11 in FIG. 6 of the drawings. The wire connector 91 is formed of plastic with a hollow interior (not shown) having a truncated conical body 93 which is covered with ribs 95 and grooves 97. An ungrooved wider cylindrical skirt 99 is formed integrally with the truncated body 93. Integrally formed fins 101 extend from the circular front end 103 of the truncated body to the cylindrical skirt 99. It should be noticed in FIG. 5 that the fins 101 are tilted in a clockwise direction relative to the diametric axis of the truncated body 93 of the finned wire connector.

When the wire connector is inserted into the socket 21 of the driver 11, the fins 101 closely fit within the grooves 67 of the inwardly located intermediate bore 31 with the axial ends of the fins 101 resting on the slightly curved shoulders 71 located near the axial bottom of the bore 31.

Figure 8:
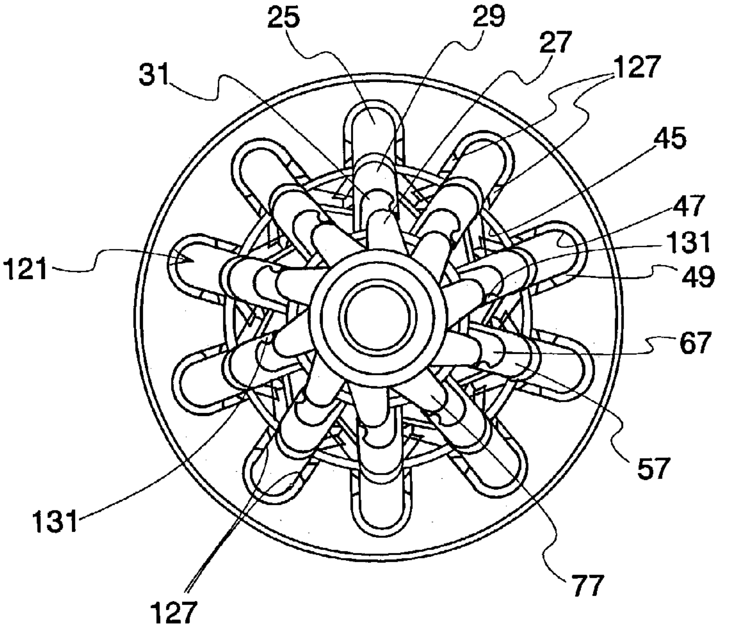
FIG. 8 is an enlarged view of the socket end of the wrench of FIG. 7 with the wire connector removed.
Figure 7:
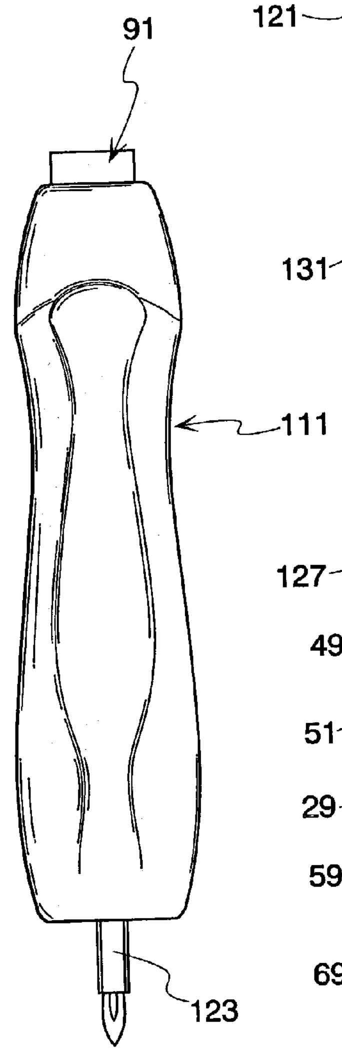
FIG. 7 is a side view of a second embodiment of the invention depicted in a hand operated wrench and screwdriver with a wire connector shown seated in a socket at one end of the wrench and a screwdriver bit seated in the opposite end of the wrench.
Figure 9:
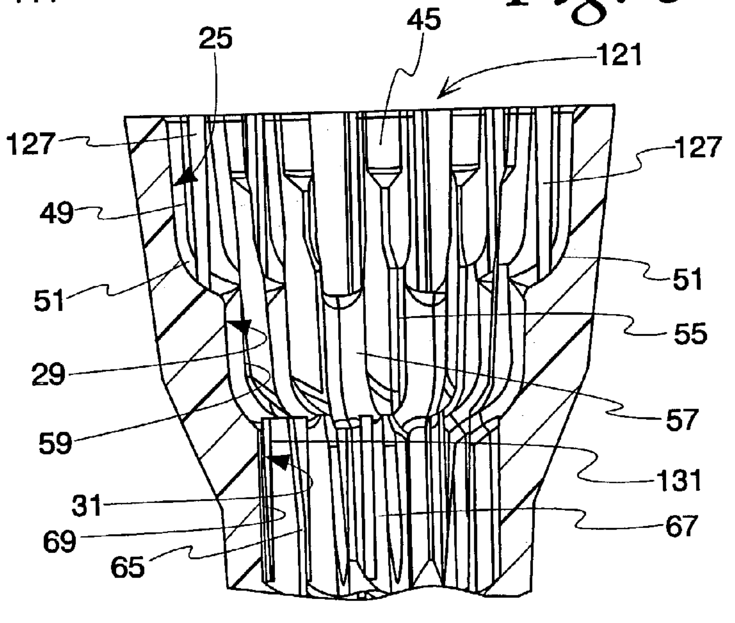
FIG. 9 is an enlarged, partial, longitudinal cross-sectional view of the socket end of FIG. 8.

In a second embodiment of the invention depicted in FIGS. 7 to 9 of the drawings, the invention is incorporated in a hand operated wrench 111. A portion of a finned wire connection 91 is shown seated in the socket 121 of the wrench. A screwdriver bit 123 is removably inserted in the wrench at the end opposite to that of the socket. As is conventional in such wrenches, other bits and tools may be removably inserted in place of the bit 123 shown herein.

The socket 121 incorporated in the hand operated wrench 111 is similar in construction to the socket 21 previously described. Portions of the socket 121 that are identical to portions of socket 21 previously described are identified by the same numbers in FIGS. 8 and 9 of the drawings and will not be further described in connection with the description of this embodiment of the invention unless necessary to illustrate or explain the additional novel aspects of the invention found only in this embodiment of the invention.

To prevent wing style connectors from falling out of the socket 121 prior to receiving wires to be connected, especially when the wrench is held with the socket 121 opening downwardly, a pre-capture element is formed in the outer bore 25 of the socket. The pre-capture element includes a pair of ribs, 127 each located on an oppositely facing wall 49 of each of the grooves 47. The ribs project towards each other a sufficient distance to engage a wing of a wing style connectors inserted in the socket.

To hold finned connectors in the socket 121 when the open end of the socket is facing downwardly prior to fastening of the wires to each other and to the connector, a pre-capture element is also formed in the inner bore 27 of the socket. This pre-capture element includes a single rib 131 located on the outer wall 79 of each groove 77. Each rib projects inwardly a sufficient distance to engage a fin 101 of a finned wire connectors inserted in the socket.

What is claimed is:

1. A device for attaching a wire connector to the ends of a plurality of wires, said device including:

an elongated socket having an end for receiving the wire connector to connect a plurality of wires to said wire connector and to one another, said socket including:

a plurality of bores of different cross sections, including an outermost bore positioned adjacent said end for receiving the wire connector of said socket;

an innermost bore positioned adjacent said end for receiving the wire connector of said socket with at least two intermediate bores positioned between said outermost and said innermost bores;

said bores decreasing in cross section from said outermost to said innermost bore;

each of said bores defined by an imperforate circumferential wall of said elongated socket having a plurality of alternately positioned ribs and grooves, said grooves of said outermost bore dimensioned to receive wings extending from a skirt of the wire connector.

2. The device of claim 1 in which one of said intermediate bores is formed with grooves dimensioned to receive wings extending from a truncated conical body of the wire connector.

3. The device of claim 2 in which said elongated socket has a longitudinal axis and said ribs and said grooves of one of said intermediate bores are rotated to extend non-radially to said longitudinal axis of said elongated socket.

4. The device of claim 1 in which said elongated socket is formed in a driven wrench body.

5. The device of claim 1 in which said elongated socket is formed in a hand operated wrench body.

6. The device of claim 1 in which a pre-capture element is formed in said grooves of said outermost bore.

7. The device of claim 6 in which said pre-capture device includes a projection formed on at least one of said oppositely located side walls of said groove.

8. The device of claim 6 in which said pre-capture element includes a projection formed on each of the oppositely located side walls of said groove.

9. The device of claim 1 in which a pre-capture element is formed in said grooves of said innermost bore.

10. The device of claim 9 in which said pre-capture element is an elongated rib formed on a wall of each of said grooves.

* * * * *